United States Patent [19]

Suzuki

[11] Patent Number: 4,727,463
[45] Date of Patent: Feb. 23, 1988

[54] POWER SUPPLY DEVICE COMPRISING MEANS FOR MODULATING THE OUTPUT THEREOF

[75] Inventor: Koji Suzuki, Yokohama, Japan

[73] Assignee: Canon Kabushiki Kaisha, Tokyo, Japan

[21] Appl. No.: 869,871

[22] Filed: Jun. 3, 1986

[30] Foreign Application Priority Data

| Jun. 13, 1985 | [JP] | Japan | 60-127195 |
| Jun. 13, 1985 | [JP] | Japan | 60-127196 |
| Jun. 13, 1985 | [JP] | Japan | 60-127197 |
| Jun. 13, 1985 | [JP] | Japan | 60-127198 |
| Jun. 13, 1985 | [JP] | Japan | 60-127199 |

[51] Int. Cl.$^4$ .......................................... H02M 3/335
[52] U.S. Cl. .............................. 363/21; 355/14 CH; 355/14 D
[58] Field of Search ................ 363/20, 21, 41, 97, 363/131; 307/11, 12; 355/14 CH, 14 D

[56] References Cited

U.S. PATENT DOCUMENTS

| 3,230,382 | 1/1966 | Burns et al. | 307/11 |
| 4,034,280 | 7/1977 | Cronin et al. | 363/97 X |
| 4,355,884 | 10/1982 | Honda et al. | 355/14 CH |
| 4,478,505 | 10/1984 | Tashiro | 355/14 D X |
| 4,531,181 | 7/1985 | Herz et al. | 363/21 |
| 4,535,399 | 8/1985 | Szepesi | 363/41 |
| 4,561,046 | 12/1985 | Kuster | 363/21 |

Primary Examiner—Peter S. Wong
Assistant Examiner—Marc S. Hoff
Attorney, Agent, or Firm—Fitzpatrick, Cella, Harper & Scinto

[57] ABSTRACT

There is disclosed a power supply device capable of providing stable AC and DC output voltages. For this purpose an input voltage is chopped by a controlled switching device and supplied to a converter transformer to obtain a high output voltage at the secondary side, and the output voltage is separated in two portions for supply to two loads.

21 Claims, 11 Drawing Figures

POWER SUPPLY DEVICE COMPRISING MEANS FOR MODULATING THE OUTPUT THEREOF

BACKGROUND OF THE INVENTION

The present invention relates to a power supply device, and in particular to a power supply device for exciting a converter transformer by switching a primary input thereto, thereby obtaining a high-voltage output at the secondary side thereof.

In certain apparatus such as a copying machine or a laser beam printer, there are required a high-voltage power supply for a charger for charging a photosensitive member, and another power supply for obtaining a DC-overlapped AC developing bias voltage for controlling the developing condition of a developing unit.

In such apparatus there is generally employed a method of converting the commerical line supply voltage to a lower voltage in the order of 24 V for stabilization, and elevating the voltage again, followed by rectification, in a high-voltage power supply unit.

In the conventional apparatus the aforementioned high-voltage DC power supply for the charger and the other power supply for obtaining the DC-overlapped AC output for the developing bias voltage are constructed as separate units, and both are designed to obtain desired voltages by elevating a low voltage. Particularly the DC and AC voltages for the developing unit have been obtained with separate converters, so that the power supply unit is complex in structure and cannot be easily compactized.

SUMMARY OF THE INVENTION

In consideration of the foregoing, an object of the present invention is to provide an improved power supply device.

Another object of the present invention is to provide a power supply device which can be made compact in size and light in weight.

Still another object of the present invention is to provide an inexpensive power supply device of a simpler structure.

Still another object of the present invention is to provide a power supply device allowing to stably obtain an AC output and a DC output from a single transformer.

The foregoing and still other objects of the present invention will become fully apparent from the following description to be taken in conjunction with the attached drawings.

DETAILED DESCRIPTION OF THE PREFERRED EMBODIMENTS

Now the present invention will be clarified in detail by embodiments thereof shown in the attached drawings.

Figure 1:
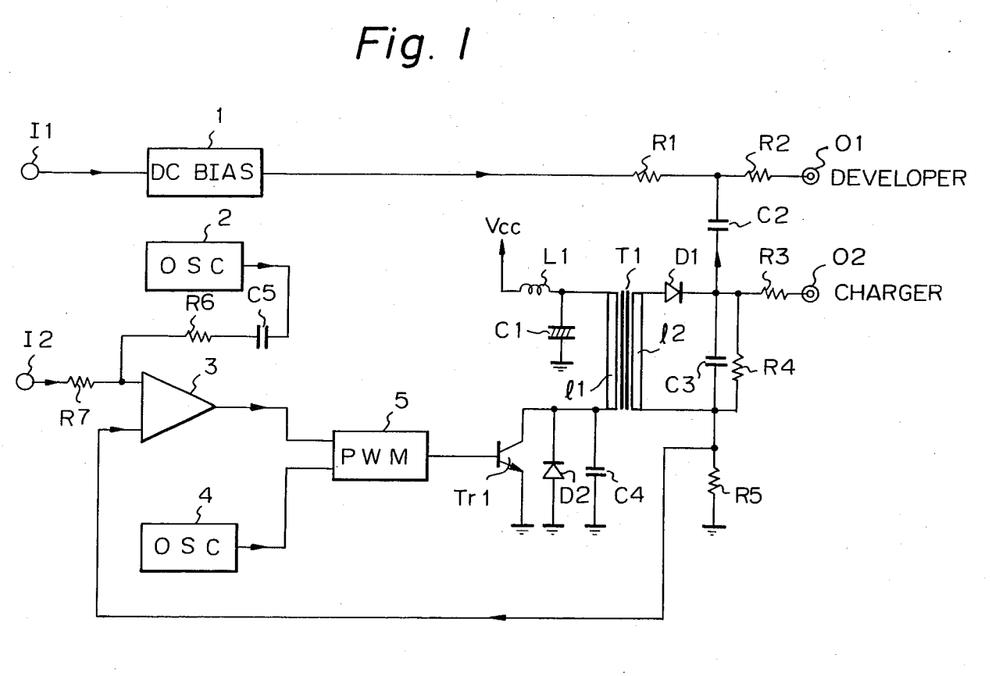
FIG. 1 is a circuit diagram of a power supply device of the present invention, for use in an image forming apparatus.

FIG. 1 is a circuit diagram of a power supply device capable of supplying electric power to the charger and developing unit of an image forming apparatus, from a single transformer.

A primary coil 11 of a converter transformer T1 receives a low voltage Vcc through a choke coil L1 and a capacitor C1, and the other end of said coil is connected or disconnected by a transistor Tr1. Between the collector and grounded emitter of said transistor Tr1 there are connected a damper diode D2 and a resonance capacitor C4.

The switching operation of the transistor Tr1 is controlled by a pulse width modulator (PWM) 5, which regulates the duty ratio of a square wave generated by an oscillator 4 in response to the output of a differential amplifier 3, thereby controlling the output of the transformer. The high output voltage of a secondary coil 12 of the converter transformer T1 is rectified and smoothed by a diode D1 and a capacitor C3, and supplied through an antisparking resistor R3 and a terminal O2 to the charger. A current corresponding to the load current flows in a resistor R4 and is detected, as a voltage corresponding to the load current, through a resistor R5.

The detected voltage corresponding to the load current is supplied to an input terminal of the differential amplifier 3, of which the other input terminal receives a reference voltage, corresponding to a determined load current, through a resistor R7. Also said terminal receives the output of an oscillator 2, generating a square wave, through a capacitor C5 and a resistor R6. On the other hand, the rectified and smoothed output of the coil 12 is taken out through a coupling capacitor C2, then is overlapped, through a coupling resistor R1, with a DC voltage generated by a DC bias generating circuit 1 under the control of an input terminal I2 and is released as the bias voltage for the developing roller through a protecting resistor R2 and a terminal O1.

In the following there will be given an explanation on the function of the above-explained circuit, while making reference to FIG. 2, which shows the output of the oscillator 2, output of the oscillator 4, rectified and smoothed output of the secondary coil 12 of the converter transformer T1 and developing bias voltage from the terminal O2, from top to bottom.

Figure 2:
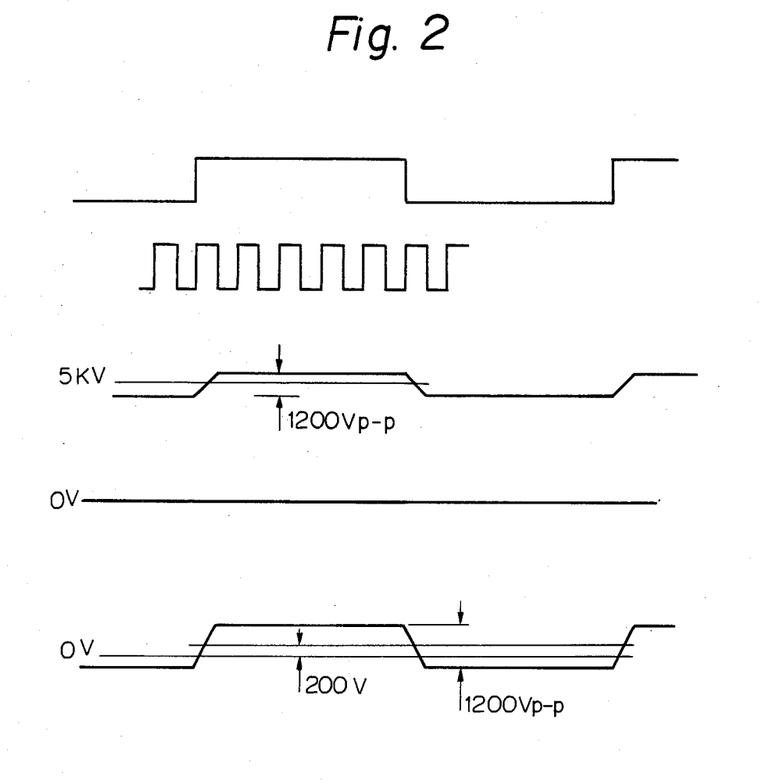
FIG. 2 is a waveform chart showing voltages in the circuit shown in FIG. 1.

When the voltage Vcc is supplied to the primary coil 11 of the converter transformer T1 and the oscillator 4 is caused to oscillate with a frequency of 20 to 100 kHz as shown in the second graph in FIG. 2, the secondary coil 12 generates an AC voltage elevated according to the ratio of the number of turns of coils. This current is rectified and smoothed by the diode D1 and capacitor C3, and supplied to the charger through the resistor R3.

This load current is detected through resistor R5 and supplied to the differential amplifier 3, which thus controls the pulse width modulator 5 in response to the other input value, thus controlling the output current.

The input terminal I2 receives a determined voltage corresponding to the load current, and also receives the output of the oscillator 2 through the resistors R6, R7. As the oscillator 2 releases a frequency of 1-2 kHz shown in the top graph in FIG. 2, which is lower than the frequency of the output of the oscillator 4 shown in the second graph of FIG. 2, the duty ratio of the converter transformer T1 is accordingly controlled by the pulse width modulator 5. As the result there is obtained, at the secondary side of the converter transformer T1, a rectified DC output of ca. 5 kV, with an overlapping AC component of a peak-to-peak value of 1.2 kV as shown in the third graph of FIG. 2, and this high voltage output is supplied to the charger.

On the other hand, said output is taken out through the capacitor C2 and is overlapped with a DC bias voltage generated by the DC bias generating circuit 1. The control input from the terminal I1 thereof is so controlled that the output from the terminal O1 has an amplitude around 200 V as shown in the lowermost graph in FIG. 2.

As explained in the foregoing, the DC high voltage for the charger and the AC developing bias voltage containing a DC component can be obtained from a circuit employing a single converter transformer. Thus, in contrast to the conventional power supply circuit employing three independent transformers, the power supply device of the present embodiment is inexpensive and simpler in structure and contributes to the compactization of the entire apparatus.

Figure 3:
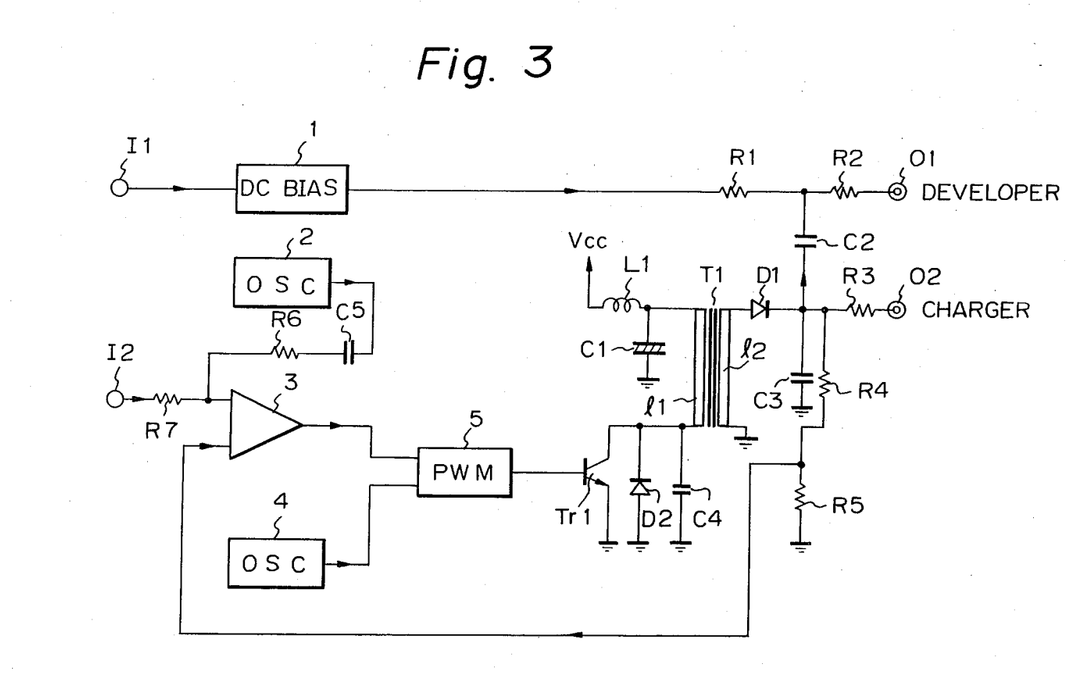
FIG. 3 is a circuit diagram of a power supply device for stabilizing a load voltage.

In contrast to the foregoing embodiment in which the load current to the charger is stabilized, FIG. 3 shows a circuit designed for stabilizing the load voltage. In FIG. 3 the rectified and smoothed output of the converter transformer T1 is returned to a differential amplifier 3 after a voltage division by resistors R4, R5. The remaining structure is identical with that shown in FIG. 1. This structure provides a constant voltage to the charger, as the pulse width modulator 5 controls the oscillation in response to the terminal voltage of the resistor R5, which corresponds to the voltage supplied to the charger from the output terminal O2.

Figure 4:
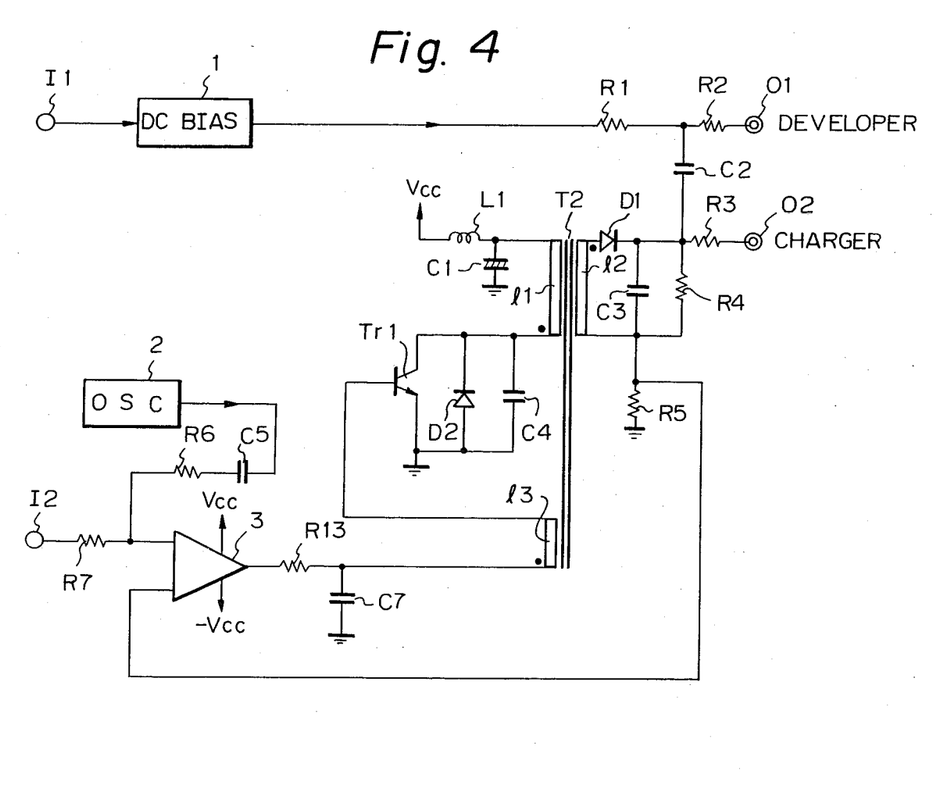
FIG. 4 is a circuit diagram of a power supply device employing a self-excited converter.

FIG. 4 shows another embodiment employing a self-excited converter.

In FIG. 4, the structure of the primary side of a converter transformer T2 is similar to that shown in FIG. 1, but the base of a transistor Tr1 is connected to a base coil 13, of which the other end is grounded through a capacitor C7 and further connected to the output of a differential amplifier 3 through a resistor R13. The remaining structure is identical with that for constant current control shown in FIG. 1.

In the circuit shown in FIG. 4, the self-excited converter oscillates in the following manner. When the transistor Tr1 is turned on, a base current is supplied from the base coil 13. The collector current of the transistor Tr1 gradually increases according to a slope depending on the inductance of the primary coil 11, thus determining the charging voltage of the capacitor C7. When the base current reaches a limit, the collector current is saturated to invert the direction of flux of the coil 11, whereby the voltage of the base coil 13 is inverted to turn off the transistor Tr1.

At this point a high-voltage rectifying diode at the secondary side starts to provide a load current. When the energy accumulated in the converter transformer during the conductive period of the transistor Tr1 is entirely released as the load current, the direction of flux is again inverted to turn on transistor Tr1. The above-explained procedure is repeated to maintain the oscillation.

The limit of the base current of the transistor Tr1 is determined by the charging voltage of the capacitor C7, or the output voltage of the differential amplifier 3. The differential amplifier 3 detects the load current in the identical manner as in the circuit shown in FIG. 1 and regulates the output in response to the sum of a voltage corresponding to said load and signals supplied from the terminal I2 and the oscillator 2. Consequently a constant current control is achieved in the same manner as in FIG. 1.

An AC component taken out through a capacitor C2 is overlapped with a DC component generated by the DC bias generating circuit 1, and supplied to the developing roller through the terminal O1.

In this manner the above-explained structure can achieve a same effect as in the case of FIG. 1.

Figure 5:
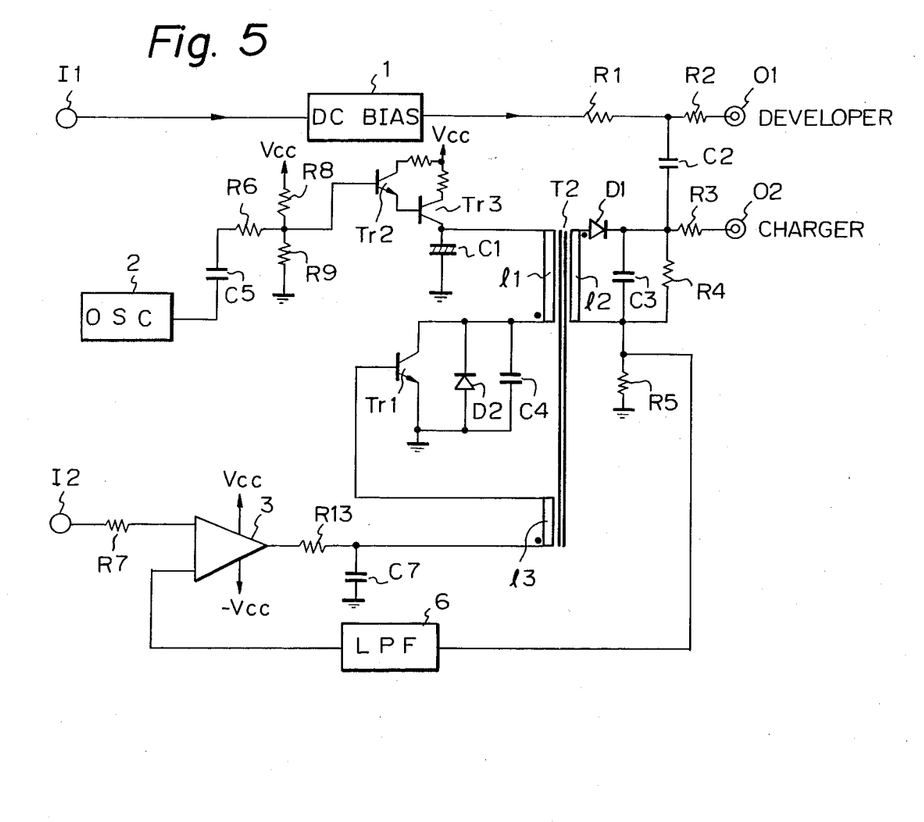
FIG. 5 is a circuit diagram of a power supply device representing a variation to the device shown in FIG. 4.

FIG. 5 shows still another embodiment, which provides an AC-overlapped high-voltage output by controlling the power supply to the converter transformer T2 with the oscillator 2, in contrast to the foregoing embodiments in which said output is obtained by modulating the reference voltage of the differential amplifier 3 with the output of the oscillator 2. The output of the oscillator 2 is connected to the base of a transistor Tr2 through a coupling capacitor C5 and a resistor R6. Resistors R6, R8, R9 determine the amplification factor of an emitter follower circuit composed of transistors Tr2, Tr3 and supplying the output to the coil 11. The remaining structure is identical to that shown in FIG. 4, except that the detection signal to be supplied to the differential amplifier 3 is converted into a DC current by a low-pass filter 6 to effect a current control in response to said DC current.

In the above-explained structure, the voltage supplied to the coil 11 of the converter transformer T2 is controlled in response to the output of the oscillator 2, thereby varying the output of the coil 12, and obtaining an AC-overlapped high voltage in the same manner.

Figure 6:
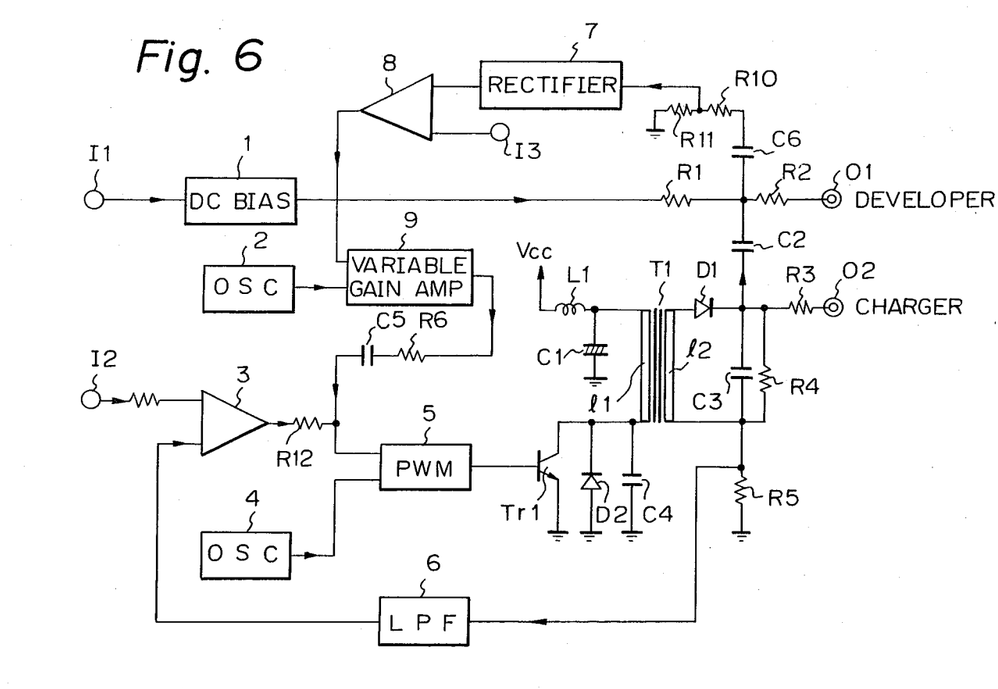
FIG. 6 is a circuit diagram of a power supply device capable of controlling an overlapping AC component.

FIG. 6 shows another embodiment for also controlling the overlapping AC component.

In the circuit shown in FIG. 6, the error signal released by the differential amplifier 3 and the AC component released by the oscillator 2 are added in a stage preceding the pulse width modulator 5, and the output of said oscillator 2 is regulated by a variable gain amplifier 9.

The gain of said amplifier 9 is controlled by the error signal supplied by a differential amplifier 8, of which an input terminal receives, through a terminal I3, a voltage corresponding to a determined AC output, and the other input terminal receives a voltage corresponding to the amplitude of the AC signal taken out through a capacitor C6, then divided by resistors R9, R10 and rectified by a rectifier 7.

The circuit shown in FIG. 6 is capable of arbitrarily controlling the output to a DC load through the terminal O2 and the output to an AC load through the terminal O1 in independent manner.

Figure 7:
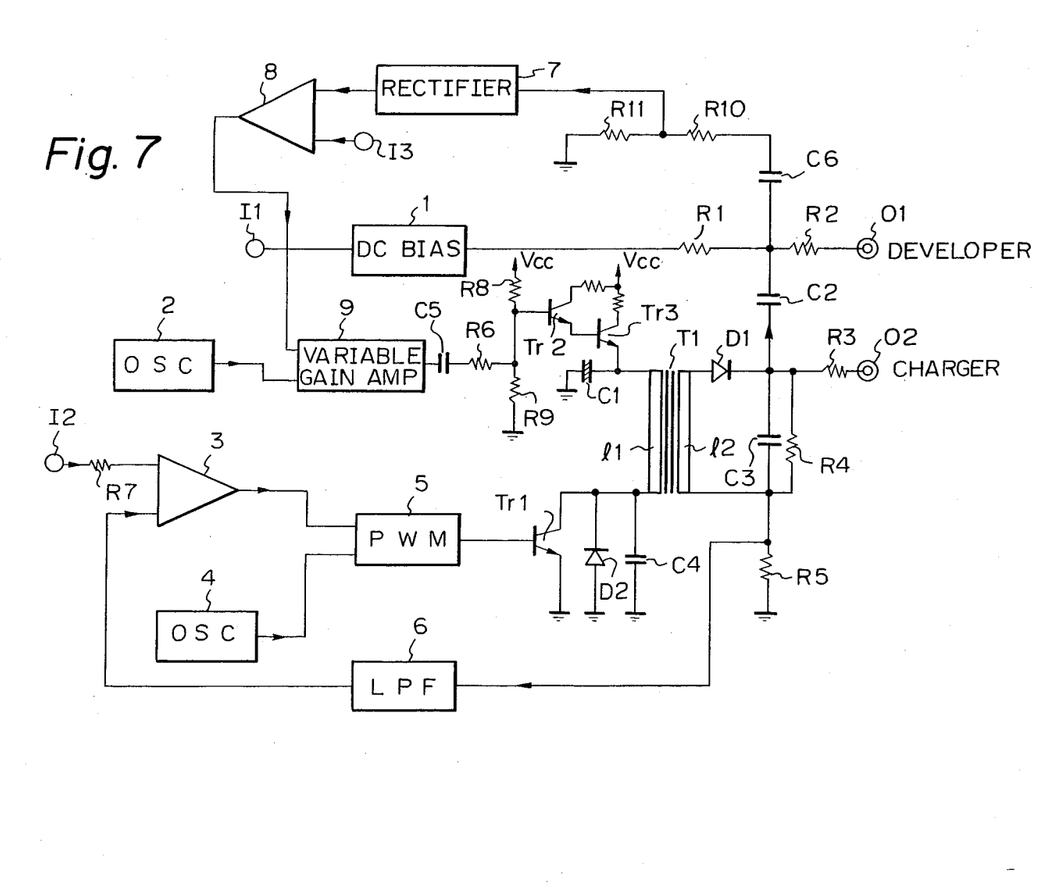
FIG. 7 is a circuit diagram of a power supply device representing a variation to the device shown in FIG. 6.

An embodiment shown in FIG. 7 is a variation to the circuit shown in FIG. 6 in such a manner that the input voltage to the converter transformer T1 is controlled as in FIG. 5 by a variable gain amplifier 9. Such structure can also provide similar effects.

Figure 8:
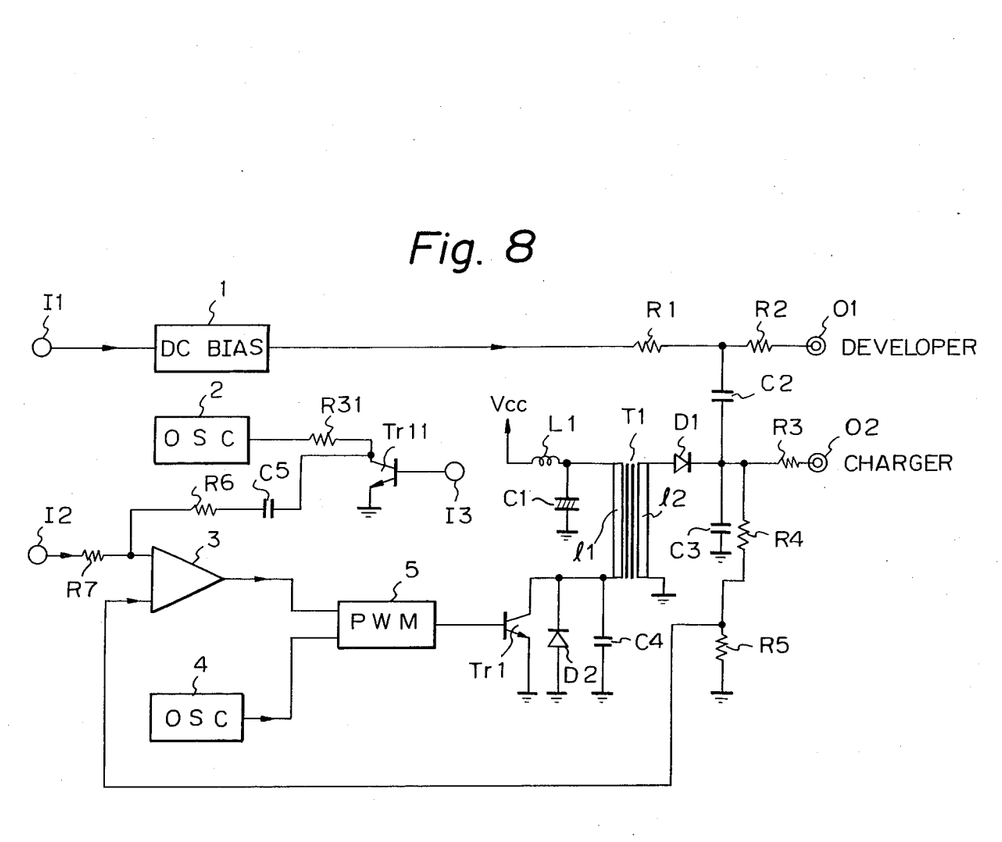
FIG. 8 is a circuit diagram of a power supply device capable of stabilizing the load voltage and controlling the AC component.

FIG. 8 shows another embodiment capable of stabilizing the load voltage and also controlling the AC component supplied to the developing unit from the output terminal O2.

In the embodiment shown in FIG. 8, the rectified and smoothed output of the converter transformer T1 is divided by resistors R4, R5 and returned to the input of the differential amplifier 3. The remaining structure is identical with that in FIG. 1, except the output control circuit for the oscillator 2 to be explained in the following. Such structure is capable of supplying a constant voltage to the charger, since the pulse width modulator 5 controls the oscillation in response to the terminal voltage of the resistor R5 which represents the voltage supplied to the charger from the output terminal O2.

In FIG. 8 a load resistor R31 is inserted between the capacitor C5 and the oscillator 2, and to the junction point between said capacitor C5 and the resistor R31 there is connected a transistor Tr11 to be controlled by the signal supplied to a terminal I3.

This structure is capable of controlling the AC component to be supplied to the developing unit. During a copying operation, the transistor Tr11 is turned off through the terminal I3 to supply an AC component to the differential amplifier 3, thereby causing said amplifier 3 to generate the AC component to be supplied to the developing unit. The DC component of the developing bias voltage is controlled by regulating the output of the DC bias generator 1 through the terminal I1. The high DC voltage supplied to the charger is controlled by regulating the voltage of the terminal I2.

Figure 9:
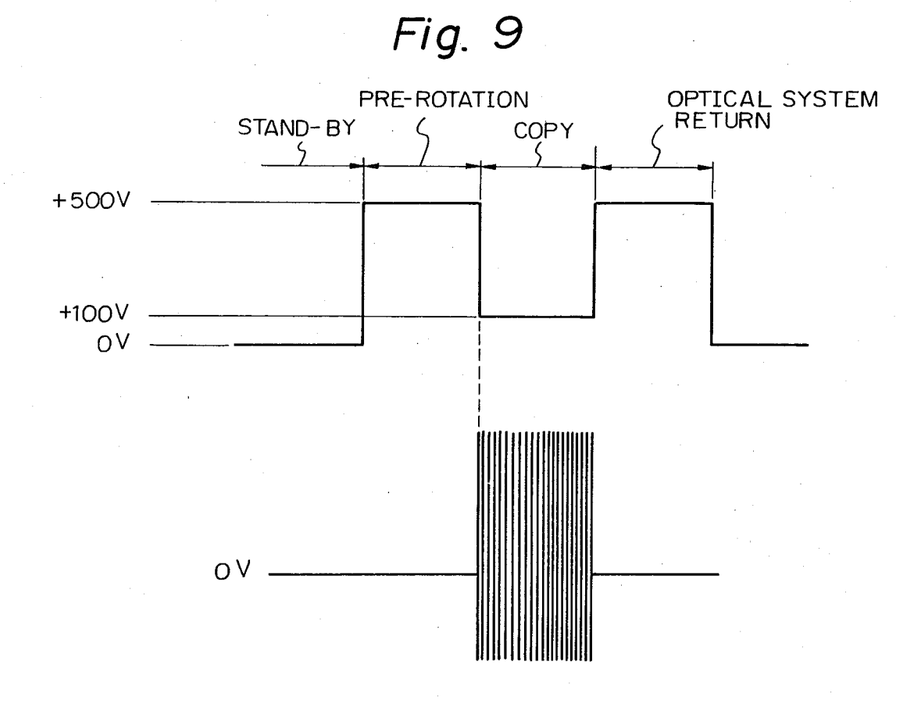
FIG. 9 is a chart showing the steps of an image forming process and the wave form of a developing bias voltage.

The output control is conducted for example as shown in FIG. 9.

In FIG. 9, the upper graph shows the output of the DC bias generating circuit 1, while the lower graph shows the wave form of the developing bias voltage released from the terminal O1. In case of a copying operation, the image forming process can be roughly divided into a stand-by step, a pre-rotation step of the photosensitive drum, a copying step and a returning step of the optical system to the home position. In the stand-by step the developing bias is maintained at 0V by the output from the terminal I1, as shown in the upper graph. In the pre-rotation step and the returning step, a DC component of +500 V is supplied for preventing toner deposition onto the photosensitive drum, and, in the copying step, a DC component of +100 V is supplied for preventing background fog in the non-image area of the original.

On the other hand, except in the copying step, the signal to the terminal I3 is maintained at a high level state to turn on the transistor Tr11, thereby intercepting the output of the oscillator 2. At the start of the copying step, the transistor Tr11 is turned off through the terminal I3, whereby the output of the oscillator 2 is added to the input to the differential amplifier 3. Thus an AC developing bias voltage, overlapped with a bias of 100 V as shown in the lower graph, is generated and supplied to the developing unit from the terminal O2.

In this manner the power supplies to the charger and the developing unit can be independently controlled.

It is furthermore possible to generate the DC component of the developing bias voltage from the converter transformer T1.

Figure 10:
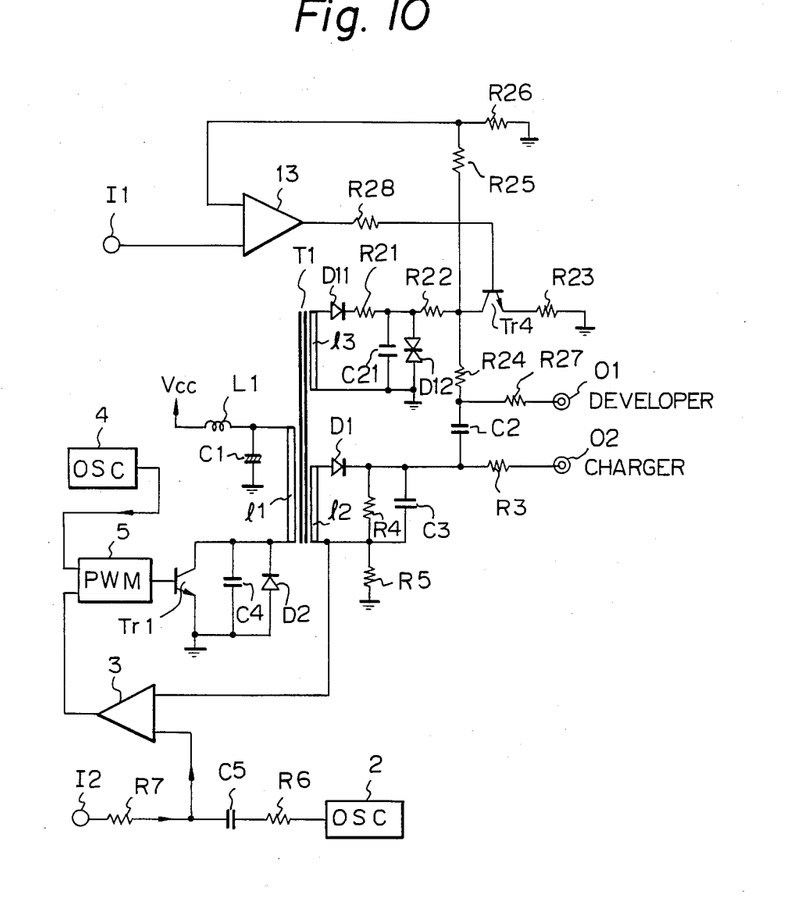
FIG. 10 and 11 are circuit diagrams of a power supply device further capable of controlling the DC component of a developing bias voltage.

In an embodiment shown in FIG. 10, the structure of the primary side and of the secondary coil 12 of the transformer T1 is identical with that shown in FIG. 1, but there is provided another coil 13 at the secondary side, and an AC voltage generated therein is rectified by a diode D11, and is applied, through a resistor, to a smoothing capacitor C12 and a protecting varistor D12 to obtain a DC voltage of ca. 500-600 V. Said DC output voltage is supplied, through a resistor R22, to the collector of an emitter-grounded high-voltage transistor Tr4. Said collector voltage is supplied, after division by resistors R25, R26, to a differential amplifier 13 and compared with a reference voltage entered from the terminal I1. The terminal I1 receives a reference voltage representing the DC component of the developing bias voltage, and the differential amplifier 13 controls the DC component by regulating the base potential of the transistor Tr4 through a resistor R28.

The collector voltage of the transistor Tr4 is taken out through a resistor R24 while the overlapping AC component generated in the aforementioned manner in the coil 12 is taken out through the capacitor C2, and thus obtained developing bias voltage is supplied to the developing unit through a resistor R27 and the terminal O1.

Such structure, being capable of obtaining also the DC component of the developing bias voltage from a single converter transformer, enables to compactize the power supply device.

Figure 11:
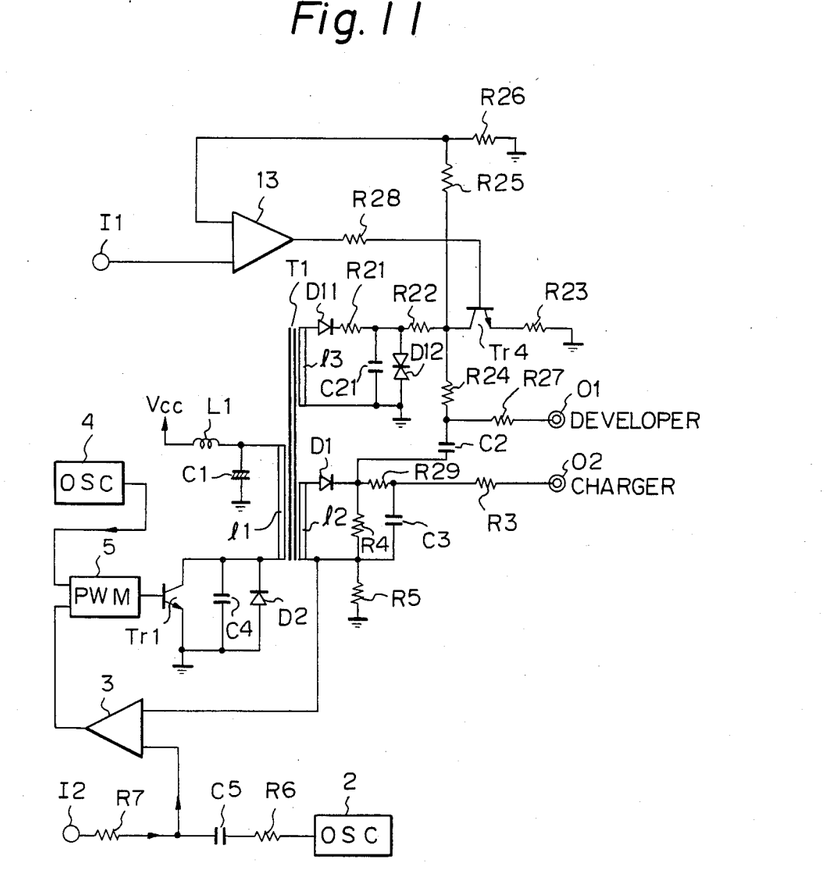

In an embodiment shown in FIG. 11, the rectified output of the coil 12 is supplied to an integrating circuit composed of a resistor R29 and a capacitor C3 for removing the overlapping AC component, and the DC component alone is supplied to the charger through an antisparking resistor R3. This structure is effective in case of controlling the charger with the DC component only. The remaining structure is identical with that shown in FIG. 10.

Such structure allows to use a single converter transformer for DC and AC voltages. Thus it provides a simpler, inexpensive and compact power supply device, and it still has a wider freedom of frequency of the AC component of the developing bias voltage and is capable of highly efficient voltage conversion.

The foregoing embodiments have been liminted to the power supply device for use in an image forming apparatus such as a copying machine, but the present invention is not limited to such embodiments and is applicable to any apparatus requiring both AC and DC power supplies.

What is claimed is:
1. A power supply device comprising:
    a transformer for generating a high voltage at the secondary side thereof in accordance with a voltage supplied to the primary side thereof;
    switching means for switching the voltage supplied to the primary side of said transformer;
    rectifier means for rectifying the output of the secondary side of said transformer;
    modulation means for modulating the primary side of said transformer as a function of a characteristic of the rectified output of said rectifier means with a predetermined modulating frequency;
    first feed means for feeding the output modulated by said modulation means to a first load; and
    second feed means for extracting a modulated component from said modulated output and feeding said modulated component to a second load.

2. A power supply according to claim 1 wherein said modulation means controls the input voltage to the primary side of said transformer.

3. A power supply device according to claim 1, wherein said second feed means comprises means for generating a DC voltage and for feeding said modulated component, superposed on said DC voltage, to said second load.

4. A power supply device according to claim 2 in combination with said second load, wherein said second load is a developing device.

5. A power supply device according to claim 2 in combination with said first load, wherein said first load comprises an electrostatic charger.

6. A power supply device according to claim 1, wherein said switching means comprises a switching element connected to the primary side of said transformer and signal generating means for genernating a drive signal for driving said switching element is response to a control input, and wherein said modulation means is adapted to modulate said rectified output by controlling said signal generating means.

7. A power supply device according to claim 6, further comprising stabilizer means for detecting the output of the secondary side of said transformer and outputting an error signal for stabilizing the output of the secondary side in accordance with the output of said detection, wherein said control input is said error signal.

8. A power supply device according to claim 6, wherein said signal generating means comprises means for generating a switching signal of a predetermined switching frequency and regulation means for regulating the duty ratio of said switching signal, and is adapted to generate said drive signal by regulating said duty ratio in response to said contorl input.

9. A power supply device according to claim 8, further comprising stabilizer means for detecting the output of the secondary side of said transformer and outputting an error signal for stabilizing the output of the secondary side in accordance with the output of said detection, wherein said control input is said error signal.

10. A power supply device according to claim 8, wherein said modulation means is adapted to superpose a signal of said predetermined modulating frequency upon said control input.

11. A power supply device according to claim 10, wherein said switching frequency is higher than said modulating frequency.

12. A power supply device according to claim 10, further comprising stabilizer means for detecting the output of the secondary side of said transformer and outputting an error signal for stabilizing the output of the secondary side in accordance with the output of said detection, wherein said control input is said error signal.

13. A power supply device according to claim 12, wherein said stabilizer means is adapted to stabilize the output of said first feed means upon detecting the output of said first feed means.

14. A power supply device according to claim 13, wherein said stabilizer means is adapted to effect constant current control.

15. A power supply device according to claim 13, wherein said stabilizer means is adapted to effect constant voltage control.

16. A power supply device according to claim 13, wherein said stabilizer means is further adapted to stabilize the output of said second feed means upon detecting the output of said second feed means.

17. An image forming apparatus comprising:
latent image forming means comprising charging means for forming an electrostatic latent image on a recording member;
developing means for developing the electrostatic latent image formed on said recording member;
first output means for supplying said charging means with a voltage having a modulated component and a D.C. constant component; and
second output means for separating the modulated component from said constant D.C. component from the output of said first output means in such a manner that said modulated component becomes an AC component outputted to said developing means.

18. An image forming apparatus according to claim 17, wherein said second output means comprises means for generating a predetermined DC bias voltage and for feeding said AC component, superposed on said DC bias voltage, to said developing means.

19. An image forming apparatus according to claim 17, wherein said first output means comprises:
a converter transformer;
switching means for switching the voltage supplied to the primary side of said converter transformer;
rectifier means for rectifying the output of the secondary side of said converter transformer; and
modulation means for modulating the primary side of the transformer as a function of a characteristic of the rectified output of said rectifier means with a predetermined frequency.

20. An image forming apparatus according to claim 19, wherein said modulation means is adapted to modulate said primary side of said converter transformer by controlling said switching means.

21. An image forming apparatus according to claim 19, wherein said modulation means is adapted to modulate said primary side of said converter transformer by controlling the input voltage to the primary side of said converter transformer.

* * * * *

UNITED STATES PATENT AND TRADEMARK OFFICE
CERTIFICATE OF CORRECTION

PATENT NO. : 4,727,463

DATED : February 23, 1988

INVENTOR(S) : KOJI SUZUKI

It is certified that error appears in the above-identified patent and that said Letters Patent is hereby corrected as shown below:

COLUMN 4

Line 36, "supplying" should read --supply--.

COLUMN 6

Line 45, "liminted" should read --limited--.

COLUMN 7

Line 1, "power supply" should read
        --power supply device--.
    Line 18, "genernating" should read --generating--.
    Line 19, "is" should read --in--.
    Line 35, "contorl" should read --control--.

Signed and Sealed this

Twenty-eighth Day of February, 1989

Attest:

DONALD J. QUIGG

Attesting Officer      Commissioner of Patents and Trademarks